(No Model.)
P. N. & M. E. STOVER.
BICYCLE RACK.
No. 574,689. Patented Jan. 5, 1897.
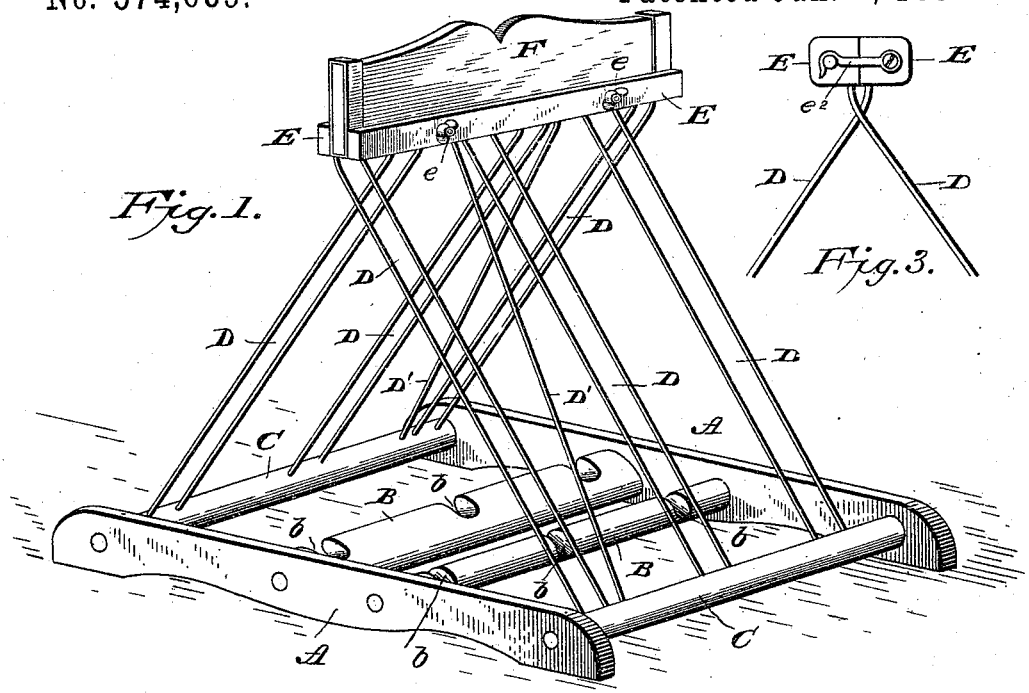
Fig. 1.
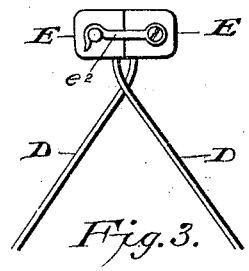
Fig. 3.
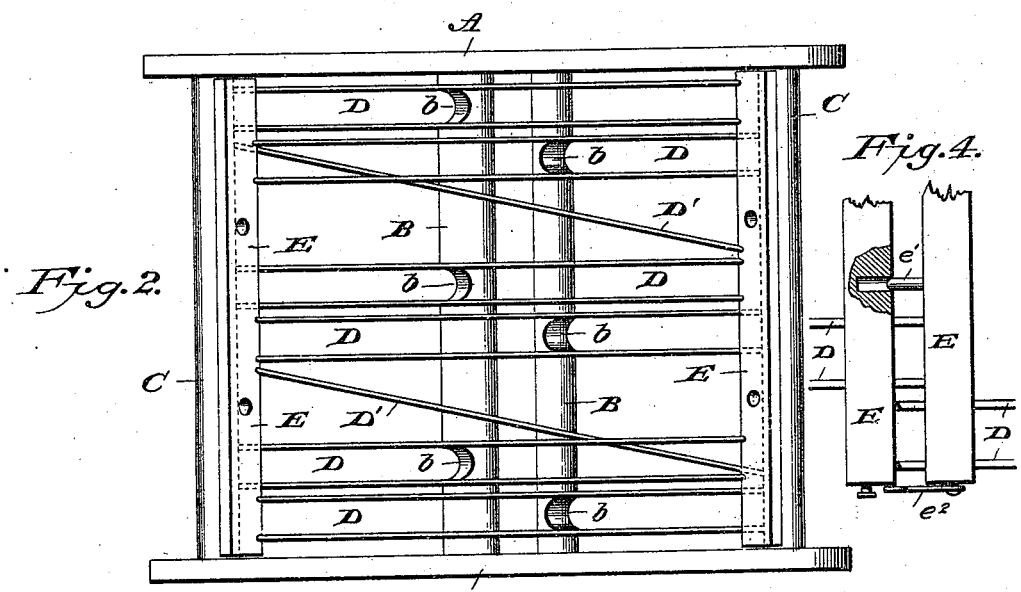
Fig. 2.
Fig. 4.
Peter N. Stover
Mark E. Stover
INVENTORS
WITNESSES
by
Attorney
THE NORRIS PETERS CO., PHOTO-LITHO., WASHINGTON, D. C.

UNITED STATES PATENT OFFICE.

PETER N. STOVER AND MARK E. STOVER, OF SAGINAW, MICHIGAN.

BICYCLE-RACK.

SPECIFICATION forming part of Letters Patent No. 574,689, dated January 5, 1897.

Application filed August 13, 1896. Serial No. 602,624. (No model.)

*To all whom it may concern:*

Be it known that we, PETER N. STOVER and MARK E. STOVER, citizens of the United States of America, residing at Saginaw, East Side, in the county of Saginaw and State of Michigan, have invented certain new and useful Improvements in Bicycle-Racks; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of our invention is to provide a simple, cheap, and effective knockdown or folding bicycle-rack which when assembled for use will present vertical supporting-bars that engage the rim of the front wheel, lower cross-bars being provided and recessed to receive the tire of the wheel, the parts being constructed to also support a sign-board.

The invention consists in the construction and combination of the parts, as hereinafter described and claimed.

In the accompanying drawings, forming part of this specification, Figure 1 is a perspective view of a bicycle-rack constructed in accordance with our invention. Fig. 2 is a view showing the parts folded upon each other, and Figs. 3 and 4 are views of a modification.

A A designate the two base-pieces of the device, which are rigidly connected to each other by two intermediate cross-bars B B, said cross-bars being provided with notches or recesses $b$, hereinafter more particularly referred to.

Between the ends of the base-pieces A A are arranged cross-bars C C, which are journaled at their ends in said base-pieces in order to have a rocking movement for the purpose hereinafter described. To these cross-bars C are secured a series of rods D, arranged in parallel sets, as shown, and the upper ends of these rods are rigidly secured to cross-pieces E E, each cross-piece being independent of the other and connected to the wires extending from one of the cross-bars C, thus forming two wire frames that can be folded down upon the base-frame, as shown in Fig. 2 of the drawings.

It will be here noted that the sets of parallel wires of one frame are out of line with the parallel wires of the other frame, so that bicycles placed in engagement with one frame will not interfere with the placing of bicycles in engagement with the other frames and consequently the notches or recesses $b$ in the cross-bars B are properly positioned with respect to the parallel wires or rods with which the bicycles engage, so as to receive the tire and thereby steady the wheel.

Diagonal brace-rods D' are secured between the cross-bars C and E to provide a more rigid structure.

The cross-bars E E are provided with transverse apertures which register and receive bolts or screws $e$, that are engaged by thumb-nuts to secure said cross-bars together when the parts are arranged as shown in Fig. 1. Instead of screws we may use dowel-pins and an end hook, as shown in the modifications Figs. 3 and 4. A sign-board F may be placed between the cross-bars E and secured in position by the bolts $e$ or dowel-pins, said sign-board having apertures which register with the apertures in said cross-bars.

In the drawings we have illustrated the device as adapted to support six bicycles, three on each side, but it is obvious the frame or device could be extended to accommodate a larger number.

In transporting bicycle-stands constructed as herein shown and described the parts can be folded upon each other to occupy a minimum amount of space.

We are aware that prior to our invention it has been proposed to make a bicycle-rack in which the top and bottom pieces are connected to each other by rods, and we therefore do not claim such construction, broadly, as our invention; but What we do claim as new, and desire to secure by Letters Patent, is—

1. In a bicycle-rack, the combination, of the base-pieces A A rigidly connected to each other by intermediate cross-bars B, cross-bars C journaled in the ends of said base-pieces, parallel rods secured to the cross-bars C to project therefrom, and independent cross-bars E secured to the ends of the rods; together with means for detachably connecting the cross-bars E to each other, substantially as shown and for the purpose set forth.

2. In a bicycle-rack, the combination of the base-pieces A A, intermediate cross-bars connected to said base-pieces and provided with notches or recesses, cross-bars C journaled in the ends of the base-pieces, rods D projecting from the cross-bars C and provided with cross-bars E at their ends, and means for connecting the cross-bars E to each other, substantially as shown and described.

3. A bicycle-rack comprising base-pieces A A rigidly connected to each other by intermediate cross-bars B, cross-bars C journaled in the ends of the base-pieces, rods D projecting from the cross-bars C and secured at their ends to cross-bars E having apertures which register; together with a sign-board having apertures which register with the apertures in the cross-bars E, and bolts or screws for connecting the sign-board and cross-bars E together, substantially as shown and described.

4. A bicycle-rack comprising longitudinal base-pieces rigidly connected to each other by intermediate cross-bars provided with recesses, as shown; cross-bars journaled in the ends of the base-pieces and having parallel rods which extend therefrom, as well as diagonal rods; cross-bars E secured to the upper ends of said rods and provided with registering apertures; and means for connecting the cross-bars E together, substantially as described, to provide a bicycle-rack the parts of which may be folded upon each other, for the purpose set forth.

In testimony whereof we affix our signatures in presence of two witnesses.

PETER N. STOVER.
MARK E. STOVER.

Witnesses:
GEO. W. FROST,
JNO. P. O'DONNELL.